United States Patent [19]

Lowe

[11] Patent Number: 4,664,064

[45] Date of Patent: May 12, 1987

[54] CAT BOX FILLER WITH INCORPORATED PESTICIDE

[76] Inventor: H. Edward Lowe, 21525 Allegheny St., Cassopolis, Mich. 49031

[21] Appl. No.: 714,442

[22] Filed: Mar. 21, 1985

[51] Int. Cl.⁴ .............................................. A01K 1/015
[52] U.S. Cl. ........................................................ 119/1
[58] Field of Search .......................... 119/1; 241/3, 17

[56] References Cited

U.S. PATENT DOCUMENTS 3,941,090  3/1976  Fry ............................................ 119/1
3,993,498  11/1976  Koekemoer ............................ 241/3

Primary Examiner—Gene Mancene
Assistant Examiner—John G. Weiss
Attorney, Agent, or Firm—Thomas J. Dodd

[57] ABSTRACT

A filler material used in a cat litter box which includes an incorporated pesticide.

6 Claims, No Drawings

CAT BOX FILLER WITH INCORPORATED PESTICIDE

SUMMARY OF THE INVENTION

This invention relates to a filler material having an incorporated pesticide and will have special application to a cat box filler.

Pest control in domestic animals has long been a major concern of pet owners. Previously, adequate pest control has been achieved by the use of pesticide-impregnated collar worn by the animal. The major drawback of these collars is that they must be worn constantly by the animal to be effective. This constant wear increases the risk of pet poisoning and presents a danger of accidental strangulation in cats.

The pest control of this invention involves the incorporation of a pesticide into granules which are dispersed in the cat litter box, when the cat uses the litter box, the pesticides granules bathe the cat in vapor and prevent the outbreak of fleas and other pests. Because the granules are dispersed within the cat box filler, pest control is achieved in the litter box as well as on the cat itself.

Accordingly, it is an object of the invention to provide for a cat litter box filler which effectively controls fleas and other animal pests.

Another object of this invention is to provide a pelletized animal pesticide which is safe, efficient and economical.

Another object of this invention is to provide a vapor active pesticide which is dispersed within a cat litter box.

Other objects of this invention will become apparent upon reading the following description.

DESCRIPTION OF THE PREFERRED EMBODIMENT

The preferred embodiment of the invention herein described has been chosen for purposes of illustration only. It is intended only to explain the principles of the invention and its application and practical use so that others skilled in the art may practice the invention.

The filler of this invention which has fluid absorption properties is adapted for use in a conventional cat litter box and includes a pesticide. A preferred filler is kaolin clay. The filler is formed by impregnating the preferred pesticide in a carrier, then distributing the filler in the cat litter box. As the cat uses the litter box, the pesticide emits a vapor which bathes the cat to control fleas and other pests. Alternatively, the pesticide may be activated by contact with the cat.

The preferred pesticide may be one of two generic types. It may be contact actuated or vapor producing. The contact actuated pesticides must actually contact the cat to be effective. Contact is generally accomplished by having the cat scratch while in the litter box. Examples of contact actuated pesticides are heptenophos, carbaryl, propoxur, resmethrin, naled, trichlorfon, tetrachlorvinphos, diazinon, fentnion and fenchlorphos. After impregnation into a carrier such as clay, or any solid, non-toxic organic polymer, the contact actuate pesticide may be packaged either directly with the cat box filler or in a separate pouch to insure containment. Alternatively, the pesticide may be sprayed directly on the cat box filler.

The preferred pesticide will be of the vapor producing variety. The pesticide is impregnated into a carrier, preferably a non-toxic organic polymer, which provides a minimal barrier to the vapor and may be pelletized. Such carriers may include polyethylene, polypropylene, polyvinyl, chloride, etc. Alternatively, the pesticide may be sprayed directly onto the cat box filler. The pellets distributed in the cat box filler emit a vapor which bathes the cat each time it uses the litter box. This vapor controls fleas, mites, ticks and other pests. Preferably the pesticides emits a sufficient vapor pressure to accomplish this purpose, such as a vapor pressure at least $1 \times 10^{-10}$ mm Hg. Examples of vapor producing pesticides are dichlorvos, pyrethrin, allethrin, naled and fenthion. Note that naled and fenthion are listed as both contact and vapor pesticides. Both of these chemicals are somewhat effective as a contact and a vapor pesticide. The concentration of the pesticide must be controlled to produce maximum efficiency while remaining safe for use during the desired time period. Exact concentration of the pesticide will depend upon vapor pressure and the effectiveness of the vapor producing pesticide, or the effectiveness of the contact pesticides.

A specific example has been chosen to explain the method of use of the pesticide:

EXAMPLE

A quantity of 97% dichlorvos (2-2 dichlorovinyl dimethylphosphate) was diluted and impregnated into an organic polymer carrier at a dichlorvos concentration of 20%. The material was then pelletized. Fifteen grams of the pellets were mixed with five pounds of cat box filler (Tidy Cat 3 ™ brand by Lowe's, Inc.). A cat was placed in a closed environment with the litter box containing the pesticide impregnated filler for twenty seven days. After four days, a high percentage (50%) reduction of adult fleas was observed. No flea larvae or pupae were found in the filler twenty seven days post-treatment. The cat suffered no ill effects during this period. After twenty seven days, the study was terminated.

It is to be understood that the invention is not limited to the above-given details, but may be modified within the scope of the appended claims.

I claim:

1. A cat box filler comprising in combination, granular filler material, and a granular carrier which includes a pesticide, said filler material having fluid absorption properties.

2. The cat box filler of claim 1 wherein said pesticide is contact activated.

3. The cat box filler of claim 2 wherein said pesticide is one of the group of materials which consists of heptenophos, carbaryl, propoxur, resmethrin, naled, trichlorfon, tetrachlorvinphos, diazinon, fenthion, and fenchlorphos.

4. The cat box filler of claim 1 wherein said pesticide emits a pest-killing vapor.

5. The cat box filler of claim 4 wherein said pesticide vapor is emitted at a vapor pressure of at least $1 \times 10^{-10}$ millimeters of Mercury.

6. The cat box filler of claim 4 wherein said pesticide is one of the group of materials which consists of dichlorvos, pyrethrin, allethrin, naled and fenthion.

* * * * *